US009608903B2

(12) United States Patent
Eastlake, III (10) Patent No.: US 9,608,903 B2
(45) Date of Patent: Mar. 28, 2017

(54) SYSTEMS AND METHODS FOR RECOVERY FROM NETWORK CHANGES (76) Inventor: Donald E. Eastlake, III, Milford, MA (US)

( * ) Notice: Subject to any disclaimer, the term of this patent is extended or adjusted under 35 U.S.C. 154(b) by 232 days.

(21) Appl. No.: 13/990,594

(22) PCT Filed: Nov. 30, 2011

(86) PCT No.: PCT/US2011/062731
§ 371 (c)(1),
(2), (4) Date: May 30, 2013

(87) PCT Pub. No.: WO2012/075204
PCT Pub. Date: Jun. 7, 2012

(65) Prior Publication Data
US 2013/0254356 A1 Sep. 26, 2013

Related U.S. Application Data (60) Provisional application No. 61/418,124, filed on Nov. 30, 2010.

(51) Int. Cl.
G06F 15/177 (2006.01)
H04L 12/741 (2013.01)
H04L 12/721 (2013.01)
H04L 12/715 (2013.01)
H04L 12/24 (2006.01)

(52) U.S. Cl.
CPC .......... H04L 45/74 (2013.01); H04L 41/0803 (2013.01); H04L 45/04 (2013.01); H04L 45/66 (2013.01)

(58) Field of Classification Search
None
See application file for complete search history.

(56) References Cited

U.S. PATENT DOCUMENTS 6,330,229 B1 * 12/2001 Jain et al. ...................... 370/256
6,542,466 B1 4/2003 Pashtan et al.
7,596,101 B2 * 9/2009 Oguchi .................. H04L 45/18
370/256
2004/0077341 A1 4/2004 Chandranmenon et al.
(Continued)

FOREIGN PATENT DOCUMENTS

WO WO 2012/075204 6/2012

OTHER PUBLICATIONS

International Search Report and Written Opinion from International Application No. PCT/US2011/062731 dated Feb. 22, 2012.

Primary Examiner — Esther B Henderson
(74) Attorney, Agent, or Firm — Wolf, Greenfield & Sacks, P.C.

(57) ABSTRACT

Systems, methods and apparatus for recovery from network changes. In some embodiments, a first network device may operating in a network comprising a second network device having a designated role according to at least one communication protocol. The first network device may detect a change relating to the second network device and determine whether the change is of a type among one or more selected types of changes. The first network device may further determine whether to inhibit operation of the first network device based at least in part on whether the change is of a type among the one or more selected types of changes.

25 Claims, 8 Drawing Sheets (56) References Cited

U.S. PATENT DOCUMENTS

| | | | |
|---|---|---|---|
| 2004/0081171 A1* | 4/2004 | Finn | H04L 12/462 370/395.53 |
| 2004/0190454 A1* | 9/2004 | Higasiyama | H04L 12/4625 370/238 |
| 2006/0092862 A1 | 5/2006 | Benedetto et al. | |
| 2007/0025275 A1* | 2/2007 | Tallet et al. | 370/255 |
| 2008/0037494 A1 | 2/2008 | Hietalahti et al. | |
| 2009/0055524 A1 | 2/2009 | Tokunaga et al. | |
| 2010/0061254 A1* | 3/2010 | Thottakkara | H04L 45/48 370/249 |
| 2011/0299528 A1* | 12/2011 | Yu | H04L 12/1886 370/390 |

* cited by examiner

| Field | Bytes | |
|---|---|---|
| MAC Destination Address | 0– 5 | |
| MAC Source Address | 6– 11 | |
| Protocol Identifier | 12– 13 | |
| Protocol Version | 14 | |
| BPDU Type | 15 | |
| Flags | 16 | |
| Root Bridge Info — Root Bridge Priority | 17– 18 | } 17– 24 |
| Root Bridge Info — Root Bridge Identity | 19– 24 | |
| Root Path Cost | 23– 26 | |
| Source Bridge Info — Source Bridge Priority | 27– 28 | } 27– 34 |
| Source Bridge Info — Source Bridge Identity | 29– 34 | |
| Port Identifier | 35– 36 | |
| additional fields | 37– ... | |

SYSTEMS AND METHODS FOR RECOVERY FROM NETWORK CHANGES

RELATED APPLICATIONS

This application is a U.S. National Stage of International Application No. PCT/US2011/062731, titled "SYSTEMS AND METHODS FOR RECOVERY FROM NETWORK CHANGES," filed on Nov. 30, 2011, which claims the benefit of U.S. Provisional Application No. 61/418,124, titled "Switching, RBridge, and ARP/ND Improvements," filed on Nov. 30, 2010, which international application and provisional application are incorporated herein by reference in their entireties its entirety.

BACKGROUND

I. Computer Networks

Figure 1:
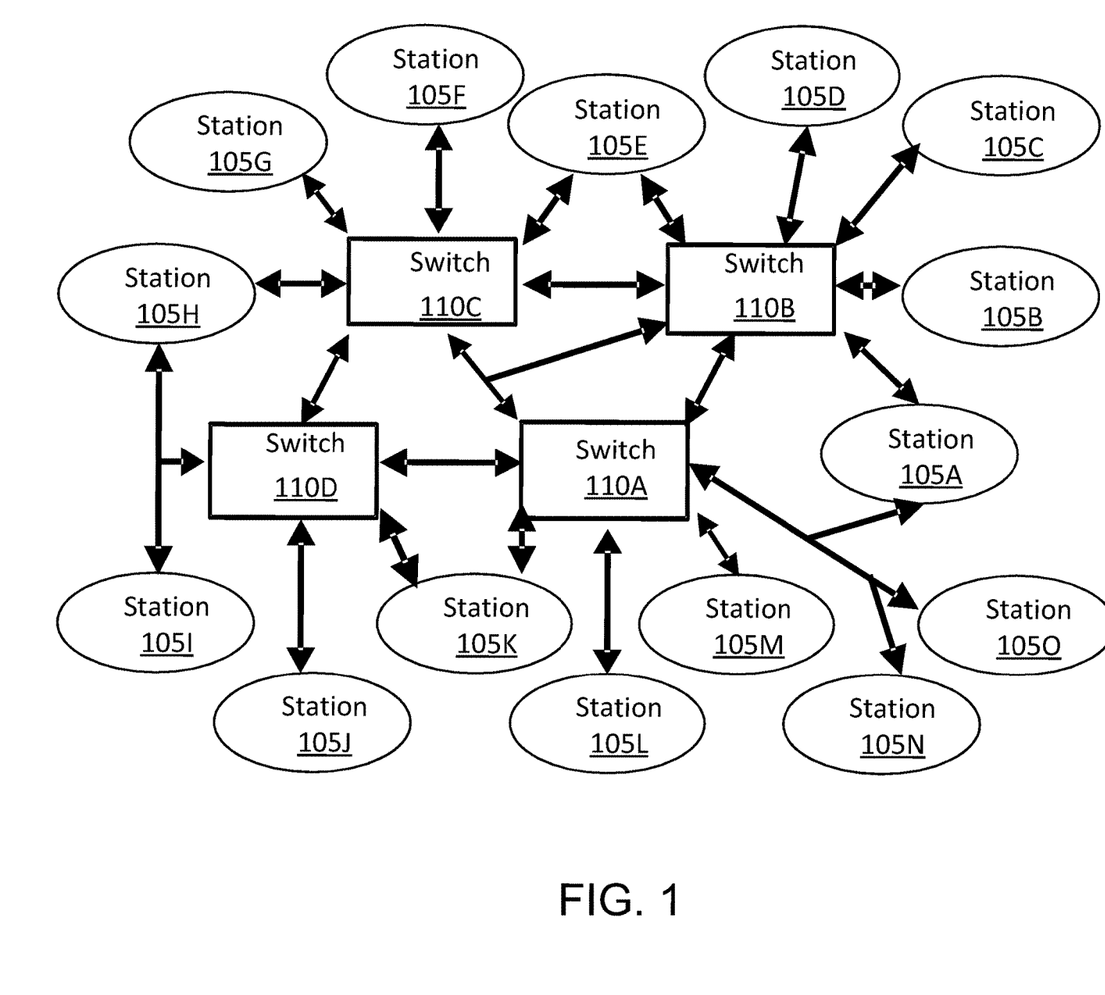
FIG. 1 shows an example of an illustrative network having connected thereto multiple computers, in accordance with some embodiments.

In a computer network, a group of computers and/or other devices communicate with each other via one or more communication links. One example of a network includes a pair of end stations each having a network interface, where the interfaces are connected to each other via a point-to-point network link. Another example of a network is shown in FIG. 1 and includes multiple computers 105A-0 each having one or more network interfaces. Each interface is connected to one or more other interfaces either directly or via one or more of switches 110A-D. For instance, as shown in FIG. 1, station 105A may be connected to station 105B via switch 110B, and station 105H may be connected to station 105I via a shared link to switch 110D. Yet another example of a network is the Internet, which is a network having many interconnected subnetworks.

Data to be transmitted, such as a file, is often divided into smaller units of data to be transmitted separately over one or more networks and re-assembled at a receiving computer. Each such unit of data is commonly called a "frame," although it should be appreciated that data can be divided into frames in any suitable way, for example, according to any suitable communication protocol.

Any suitable communication link may be used to communicate data frames between network interfaces. For example, a link may be wired (e.g., electrical or optical) or wireless (e.g., radio, microwave, or infrared). A link may also be virtual (i.e., simulated).

Many network communication protocols have been developed over the years. A common model is the layered networking model, where communication functions are grouped into logical layers. For example, in an Open Systems Interconnection (OSI) model, there are seven layers arranged from top to bottom, each layer providing services to layers above and receiving services from layers below. For instance, Layer 2 (also known as the Data Link Layer) receives data transmission and reception services from Layer 1 (also known as the Physical Layer), and provides physical addressing services to Layer 3 (also known as the Network Layer).

Concepts of communications protocols layers, such as Layer 3 and Layer 2 of an OSI model, are explained in ITU-T (International Telecommunications Union—Telecommunications Standardization Sector) Recommendation X.200, "Information Technology—Open Systems Interconnection—Basic Reference Model: The Basic Model," which is incorporated herein by reference.

II. Local Area Networks

In a local area network (also referred to as a LAN or local network), frames may be delivered after transiting the network with source and destination Layer 2 addresses, or interface source and destination addresses, associated with the frames unchanged or changed only to a form easily convertible to the original Layer 2 addresses. Examples of such local networks include, but are not limited to, bridged LANs and RBridged campuses.

It should be appreciated that local networks need not be "local" in a geographical sense. A local network may include components located in a geographical area of any suitable size (e.g., including multiple cities, states, and/or countries), and may even include components in outer space.

III. Virtual LANs

A local network may be subdivided into multiple overlaid logical networks called Virtual LANs or VLANs. A local network divided into VLANs may have the same physical structure as if not so divided. However, each data frame may, in some fashion, be labeled or categorized to indicate a VLAN to which the data frame belongs. Furthermore, a network interface may, in some fashion, be restricted or categorized in some suitable manner, so that switches may only send frames of certain labeling or categorization through interfaces with corresponding categorization. For example, certain network interfaces may be associated a particular type of traffic associated with a subset of VLANs, such as input traffic or output traffic, so that only that type of traffic associated with that subset of VLANs is sent through the interfaces.

In a local network supporting such VLANs, there may be end stations or switches that are unaware of VLANs and that receive and transmit unlabeled frames on one or more network interfaces of the end stations or switches. Such an unlabeled frame may be classified by an interface of the first VLAN-aware switch at which the frame arrives, to indicate a VLAN to which the frame belongs. The classification may be based on one or more values of one or more fields within the frame. Moreover, there may be VLAN-aware end stations that receive and transmit VLAN-labeled frames on one or more network interfaces, and/or classify unlabeled frames received on one or more interfaces as being in one or more specific VLANs.

A VLAN may include nested sub-VLANs and, likewise, may be enclosed by other higher-level VLANs. Thus, a "network" in the present disclosure may refer to any physical or virtual network, which may or may not include one or more subnetworks, and may or may not be included in one or more other networks as a subnetwork.

SUMMARY

Systems, methods and apparatus are provided for recovery from network changes.

In some embodiments, a method is provided for use by at least one first network device operating in a network, the network comprising at least one second network device having a designated role according to at least one communication protocol, the method comprising acts of: (a) detecting a change relating to the at least one second network device; (b) determining whether the change relating to the at least one second network device is of a type among one or more selected types of changes; and (c) determining whether to inhibit operation of the at least one first network device based at least in part on a result of the act (b).

In some further embodiments, an apparatus is provided, comprising at least one first network device configured to operate in a network, the network comprising at least one second network device having a designated role according to at least one communication protocol, the at least one network device further configured to perform acts of: (a) detecting a change relating to the at least one second network device; (b) determining whether the change relating to the at least one second network device is of a type among one or more selected types of changes; and (c) determining whether to inhibit operation of the at least one first network device based at least in part on a result of the act (b).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The accompanying drawings are not necessarily drawn to scale. For purposes of clarity, not every component may be labeled in every drawing.

DETAILED DESCRIPTION

Some conventional bridging standards have been based on the Spanning Tree Protocol (STP). Despite improvements over the years, such as RSTP (Rapid Spanning Tree Protocol) (e.g., as incorporated in Institute of Electrical and Electronics Engineers (IEEE) 802.1D) and MSTP (Multiple Spanning Tree Protocol) (e.g., as incorporated in IEEE 802.1Q), almost all bridging standards continue to be fundamentally based on the insights of STP, which are now over a quarter of a century old.

Conventional spanning tree works by electing a root bridge based on priority and then building a tree from that root. The priority for a bridge may include a configured priority as a most significant part of the priority and a 48-bit Media Access Control (MAC) address associated with the bridge as a less significant part of the priority.

Figure 2:
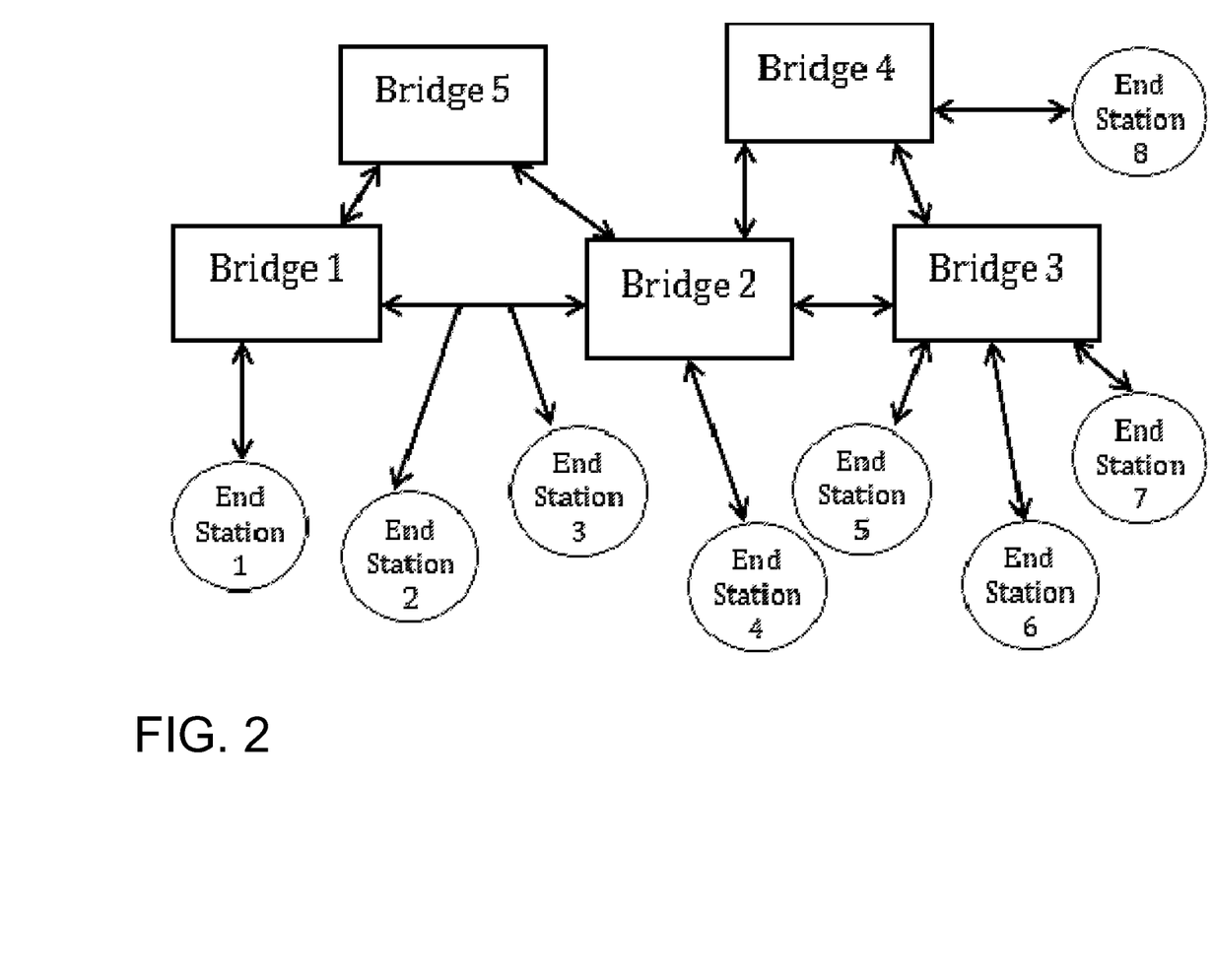
FIG. 2 shows another example of an illustrative network over which a spanning tree may be built using a spanning tree protocol, in accordance with some embodiments.
Figure 3:
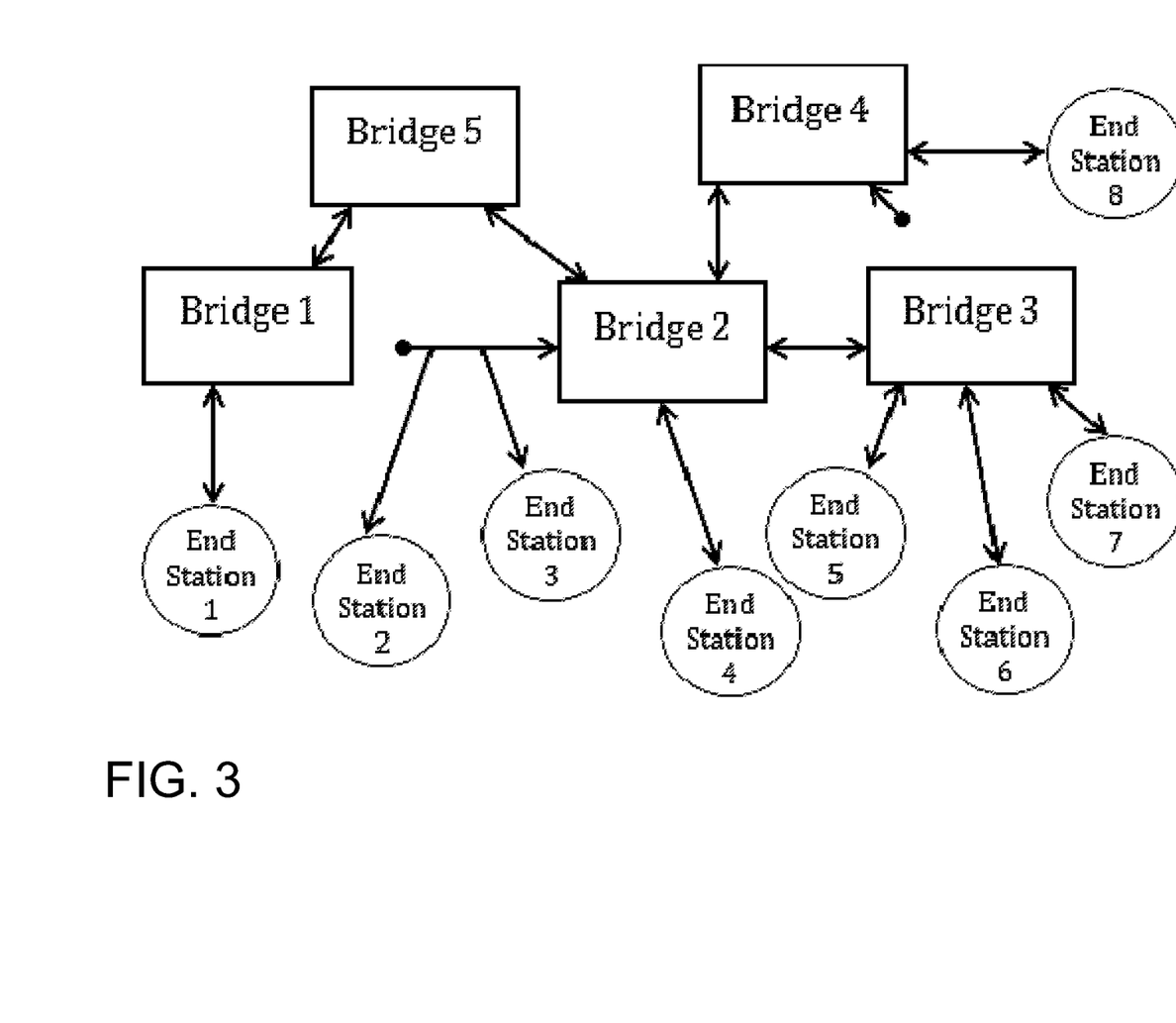
FIG. 3 shows a result of disabling certain ports at certain network devices in the illustrative network shown in FIG. 2, in accordance with some embodiments.

Without a spanning tree, traffic introduced into an illustrative network shown in FIG. 2 may cycle endlessly around rings formed by Bridges 1, 2, and 5 and by Bridges 2, 3, and 4. STP operates by turning off ports thereby reducing network connectivity to a loop-free tree structure, for example, as shown in FIG. 3. In this example shown, the port at the Bridge 1 end of the Bridge 1-2 link has been disabled and the Bridge 3 end of the Bridge 3-4 link has been disabled. (MSTP allows several different superimposed trees, each handling a different subset of traffic, but this restriction applies to each of them.)

The disabling of ports in conventional STP may have the disadvantage of wasting resources. For instance, spanning tree may reduce throughput by congesting traffic onto the links that remain connected as part of the tree selected by the STP. Further, spanning tree may increase the latency (i.e., time delay) through a network for most traffic because that traffic may not take the fastest or most direct route through the network, but is forced to follow a path within the tree selected by the STP, which may involves more hops. For instance, in the example shown in FIG. 3, traffic from an end station attached to Bridge 1 to an end station attached to any of Bridges 2 through 4 is forced, by spanning tree, to take an extra hop through Bridge 5.

Varieties of conventional STP may have other disadvantages, such as slow convergence when there are changes in network components (e.g., the addition, repair, removal or failure of bridges and/or links or the merger of two spanning tree networks). For example, the original STP standard defaults to delays of 30 seconds to respond to network changes. Even Rapid Spanning Tree Protocol configured for minimum delays may block traffic for 4 seconds for certain network failures. Such delays may be damaging for applications that require rapid failover, such as real time voice transmission or process control. For further discussion on some of the above points, see Internet Engineering Task Force (IETF) Request For Comment (RFC) 5556 ("Transparent Interconnection of Lots of Links (TRILL): Problem and Applicability Statement").

RBridges, or Routing Bridges, implement the IETF TRILL protocols. The TRILL base specification includes the following IETF RFCs, each of which is incorporated herein by reference:

RFC 6325 ("Routing Bridges (RBridges): Base Protocol Specification");

RFC 6326 ("Transparent Interconnection of Lots of Links (TRILL) Use of IS-IS");

RFC 6327 ("Routing Bridges (RBridges): Adjacency"); and

RFC 6439 ("Routing Bridges (RBridges): Appointed Forwarders").

TRILL uses link state routing techniques to route on MAC addresses and encapsulate frames with a header including a hop count limit. For example, an implementation of TRILL may be based on the link state routing protocol IS-IS, as described in International Organization for Standardization (ISO) ISO/IEC 10589:2002 ("Intermediate System to Intermediate System routeing information exchange protocol for use in conjunction with the Protocol for providing the Connectionless-mode Network Service (ISO 8473)").

An area of interconnected physical links and bridges, for example, including at least one bridge and bounded by one or more end stations, may be called a "bridged LAN." Similarly, an area of interconnected links, bridges, and RBridges, for example, including at least one RBridge and bounded by one or more end stations, may be called an "RBridge campus." To bridges, an RBridge may appear to be an end station, while, to end stations, including Internet Protocol (IP) routers, RBridges may be as transparent as bridges are. For RBridge purposes, the term "link" may include a bridged LAN.

In some implementations, RBridges may not disable ports to limit all traffic to a spanning tree as does the spanning tree protocol. Instead, RBridges may use the Appointed Forwarder mechanism described in RFC 6439, which is referenced above, to control which RBridge ports will accept or transmit frame directly from or to end stations. Under some circumstances, RBridges may appoint only one RBridge on each link to handle native frames in each VLAN. A native frame is a data frame that is not encapsulated as TRILL Data frame and is received directly from or sent directly to an end station. Furthermore, receipt and transmission of TRILL data and TRILL control frames may not be affected by whether a port is or is not an Appointed Forwarder. However, under some circumstances, an RBridge port that is designated as an Appointed Forwarder may, for loop safety, be temporarily "inhibited" from handing native frames, as explained in RFC 6439.

In some embodiments, one or more RBridge ports may be connected to a link comprising an IEEE 802.1 bridged LAN as specified in the following IEEE standards that are incorporated herein by reference:

IEEE Std 802.1D-2004 ("Media Access Control (MAC) Bridges"); and

IEEE Std 802.1Q-2011 ("Media Access Control (MAC) Bridges and Virtual Bridge Local Area Networks").

In some embodiments, a "root bridge" may be a root bridge established according to Common Internal Spanning Tree (CIST) in a bridged LAN. In this case, some version of the spanning tree protocol may be running in the bridges in that bridged LAN. The spanning tree protocol works through the exchange of BPDU (Bridge Protocol Data Unit) messages. RBridges may receive BPDU messages from immediate neighbor bridges. Each BPDU message may include information as to what the sending bridge detects as the root bridge of the spanning tree in use within the bridged LAN link. This information may include two portions, a priority portion and a bridge identifier portion. The bridge identifier may be unique for each bridge in the bridged LAN. The spanning tree root bridge within a bridged LAN link may be selected as a bridge with a highest priority portion with ties in priority broken by comparison of bridge identifiers. In some embodiments, simultaneous ties in both the priority portion and the bridge identifier portion may be broken using a port identifier.

Figure 4:
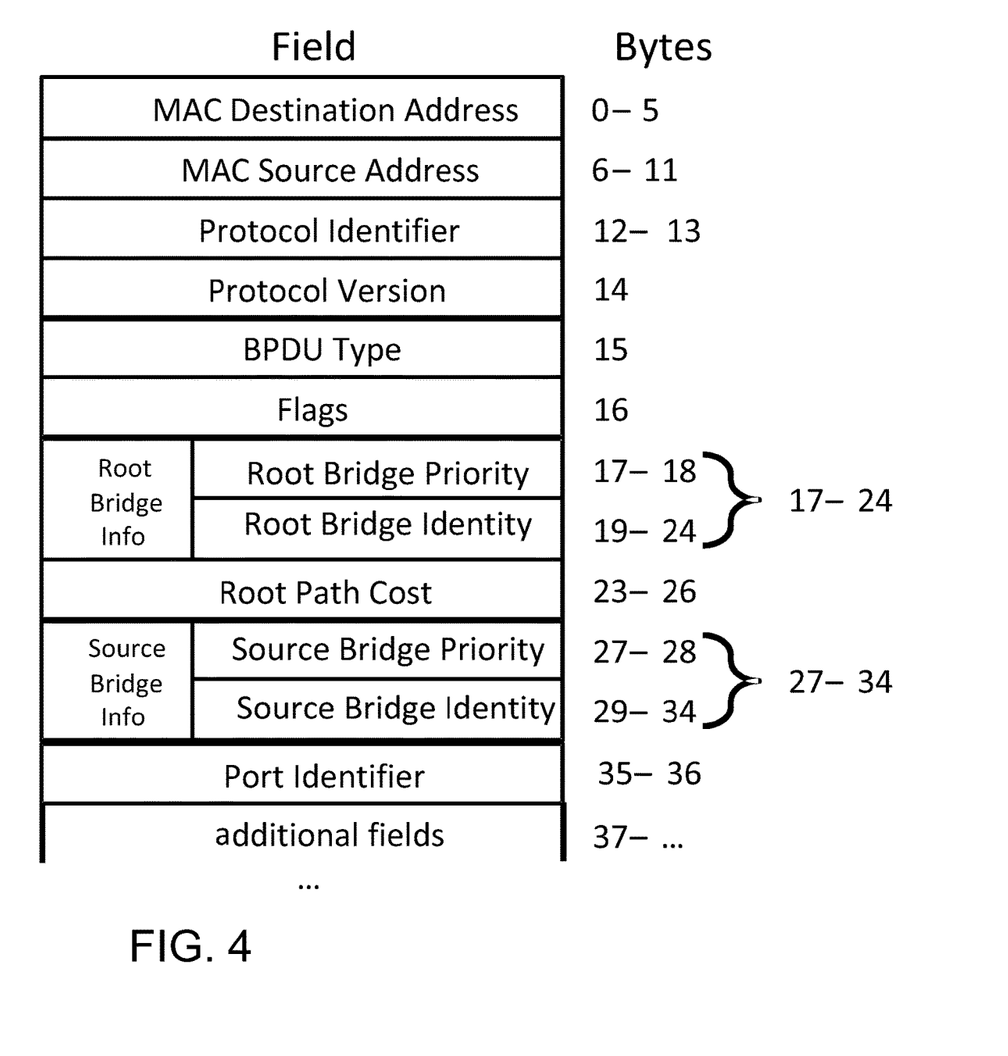
FIG. 4 shows an illustrative data structure that can be used for bridge protocol data unit (BPDU) messages, in accordance with some embodiments.

FIG. 4 shows an illustrative data structure for a BPDU frame, in accordance with some embodiments. BPDUs may be sent on links between switches, including bridges. In this example, the Destination MAC Address field may include an allowed BPDU multicast address, for instance, either the Bridge Group Address (01-80-C2-00-00-00) or the Provider Bridge Group Address (01-80-C2-00-00-08)t. The Source MAC Address field may be a MAC address of a port on which the BPDU is transmitted. The Protocol Identifier field is zero.

The Protocol Version and Flags fields may take on a variety of values. The BPDU type may be zero to indicate a Configuration BPDU containing a Root Bridge Information field. The Root Bridge Information field may include the identification and configurable priority of a root bridge. The Source Bridge Information field may include this same information for the bridge transmitting the BPDU. If the transmitting bridge is the root bridge, then the Root Bridge Information and the Source Bridge Information may be identical. The Root Path Cost field may also take on a variety of values, for example, to indicate the sending bridge's belief as to the cost of the spanning tree path to the root bridge (e.g., zero if the sending bridge believes itself to be the root bridge). This cost may be estimated as an accumulated sum over links traversed on the spanning tree path from the bridge sending the BPDU to the root bridge of, for each such link, the integer part of the quotient of twenty trillion (20,000,000,000,000) divided by the speed of the link in bits per second. In this manner, faster links may be estimated as having lower cost.

The Port Identification field may include a value unique for each port of the switch transmitting the BPDU. The additional fields may take on a variety of values, and the presence of one or more of these additional fields may be dependent on the version of the Configuration BPDU.

If there is a change in a bridged LAN, such as that bridged LAN becoming connected to and merging with another bridged LAN (where this second bridged LAN could be as small as a single bridge), or a failure of a bridge or a connection within the bridged LAN, a spanning tree within the bridged LAN may need to reconfigure. This reconfiguration may lead to a sudden appearance of new connectivity. For example, if two bridged LANs merge, two RBridges, one connected to each of these previously separate bridged LANs, may become connected where previously these RBridges were not connected. Furthermore, while the spanning tree is reconfiguring within this combined bridged LAN, TRILL control messages may be temporarily blocked by the spanning tree protocol, making it harder for the attached RBridges to detect each other and thus detect any changes in connectivity. These control messages may include the so-called "Hello" messages whereby RBridges find their neighbor RBridges and determine local connectivity.

Figure 5:
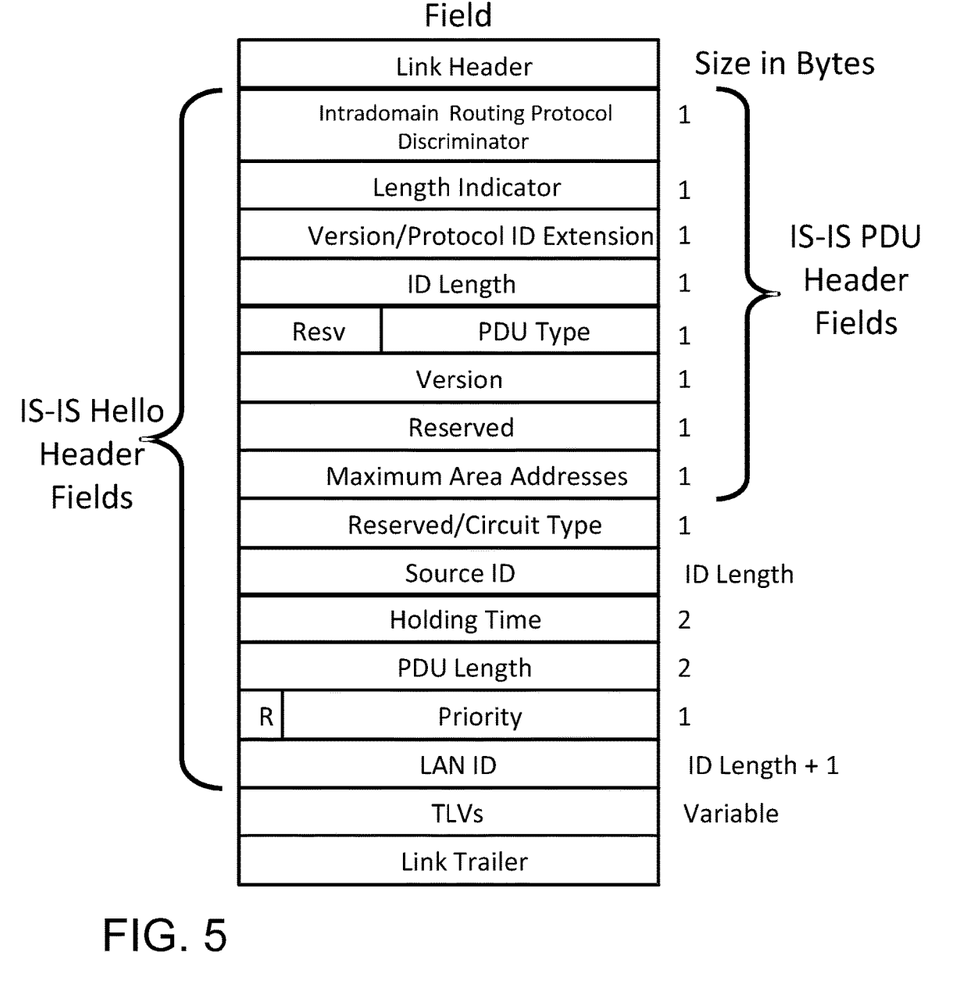
FIG. 5 shows an illustrative data structure that can be used for a type of protocol messages called "Hello" messages, in accordance with some embodiments.

FIG. 5 shows an illustrative data structure that can be used for a TRILL IS-IS Hello, in accordance with some embodiments. In this example, the Hello message begins with a Link Header and ends with a Link Trailer that are appropriate for a corresponding link technology type. For example, on an Ethernet link the Link Header may include an appropriate multicast MAC destination address (e.g., the All-IS-IS-RBridges address 01-80-C2-00-00-41) from the block of multicast addresses assigned to TRILL (e.g., 01-80-C2-00-00-40 through 01-80-C2-00-00-4F), followed by a MAC source address of the port from which the Hello message was sent. In some embodiments, the MAC source address may be followed by a VLAN tag and then the L2-IS-IS EtherType (e.g., 0x22F4), while the Link Trailer for Ethernet may be the 4-bytes Frame Check Sequence (FCS).

The information between the header and trailer may start with one or more IS-IS Hello fields that may in turn begin with one or more fields for one or more IS-IS PDUs (Protocol Data Units). The PDU fields may in turn start with a one byte Intradomain Routing Protocol Discriminator which is a byte of value 0x83. For a TRILL Hello message according to the current TRILL standard, the PDU Type field is 15 to indicate a Level 1 IS-IS Hello PDU but future extensions to TRILL may use PDU Type 16 for a Level 2 IS-IS Hello PDU. It should be appreciated that various techniques described herein are not limited any particular PDU Type value, as other values may also be suitable. Finally, the Source ID field may identify the RBridge sending the Hello message and indicate connectivity from that RBridge to the receiving RBridge, and the TLVs area may include a variety of information encoded in a TLV (Type, Length, Value) format.

As discussed above, some network changes may lead to sudden, undetected appearance of connectivity. The inventor has recognized and appreciated that such undetected connectivity may result in frames looping in the network. For instance, if there are two or more RBridge ports that are Appointed Forwarders on a link for the same VLAN, then a native frame sent onto the link by one such port may be picked up by a second such port, encapsulated into a TRILL data frame in which form the native frame may be sent back through the campus to the first port. The first port may then undo the encapsulation to change the encapsulated frame back to a native frame and again sends the native frame on the link, thereby producing a loop. Such loops may lead to links becoming saturated with looping traffic, which may in turn lead to spreading congestion and conditions sometimes referred to as a "network melt-down."

In some implementations, the IETF RBridge base protocol mitigates the risk of looping by inhibiting an RBridge port that detects a change in a spanning tree root bridge. Such inhibition may be for a configurable period of time, for example, between zero and 30 seconds, with a default of 30 seconds.

Figure 6:
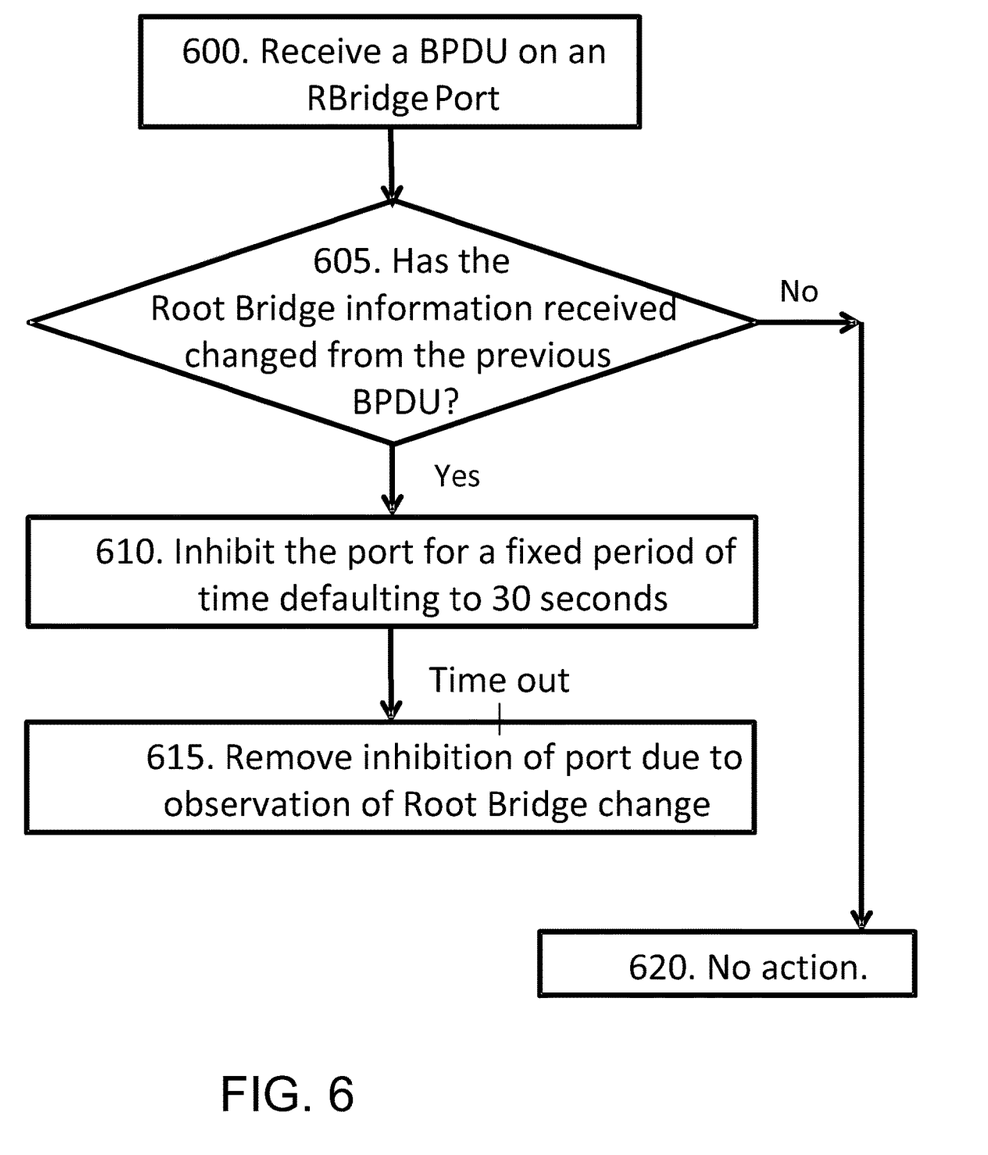
FIG. 6 shows an illustrative process that can be performed by a network device to determine whether to inhibit certain operations, in accordance with some embodiments.

FIG. 6 shows an illustrative process that may be performed by an RBridge to determine whether to inhibit a port, in accordance with some embodiments. In this example, a BPDU message is received at an RBridge port at step 600. At step 605, the RBridge determines if the root bridge information in the received BPDU message has changed from the last BPDU received on that port. If a change is detected, the port is inhibited for that reason at step 610. After a suitable time out, at step 615, the inhibition due to observed root bridge change may be removed. If at the step 605 no change in the root bridge information is detected, the RBridge may proceed to step 620 and take no special action. As described in RFC 6439, there may be other reasons for an RBridge to be inhibited besides observed root bridge changes.

In some embodiments, an RBridge port while "inhibited" may ignore any native frames the port receives. Alternatively, or additionally, the port may discard any native frames that would have been sent on that port. This may be done even if those frames are in a VLAN for which the RBridge is an appointed forwarder. In some further embodiments, inhibition may have no effect on the handling of TRILL data or control frames. However, it should be appreciated that an RBridge port may be inhibited in any suitable, as aspects of the present disclosure are not limited in this respect.

The inventor has recognized and appreciated that, while such multiple-second long inhibitions in the handling of native frames may improve loop safety, it may be undesirable not to provide native frame service to end stations for such a lengthy period of time. The inventor has further recognized and appreciated that some types of changes in root bridge information may not warrant RBridge port inhibition. For instance, changes to lower overall priority Root Bridge Information, or changes just in the priority portion of the Root Bridge Information field and not in the bridge identifier portion of the Root Bridge Information field may suggest that only a simple change has occurred in the attached bridged LAN. Thus, port inhibition may be relatively safe in such circumstances. In addition, the inhibition of a port due to an observed root bridge change may be removed before the time-out period expires in certain low-risk scenarios. For instance, the inhibition may be removed early, when the RBridge has established connectivity through the port observing an root bridge change to all RBridges in the RBridge's link-state database that report seeing either the old root bridge or the new root bridge on at least one port.

Following below are more detailed descriptions of various concepts related to, and embodiments of, inventive systems, methods and apparatus for recovery from network changes. It should be appreciated that various concepts introduced above and discussed in greater detail below may be implemented in any of numerous ways, as the disclosed concepts are not limited to any particular manner of implementation. For instance, the present disclosure is not limited to the particular arrangements of components shown in the various figures, as other arrangements may also be suitable. Such examples of specific implementations and applications are provided solely for illustrative purposes.

Figure 7:
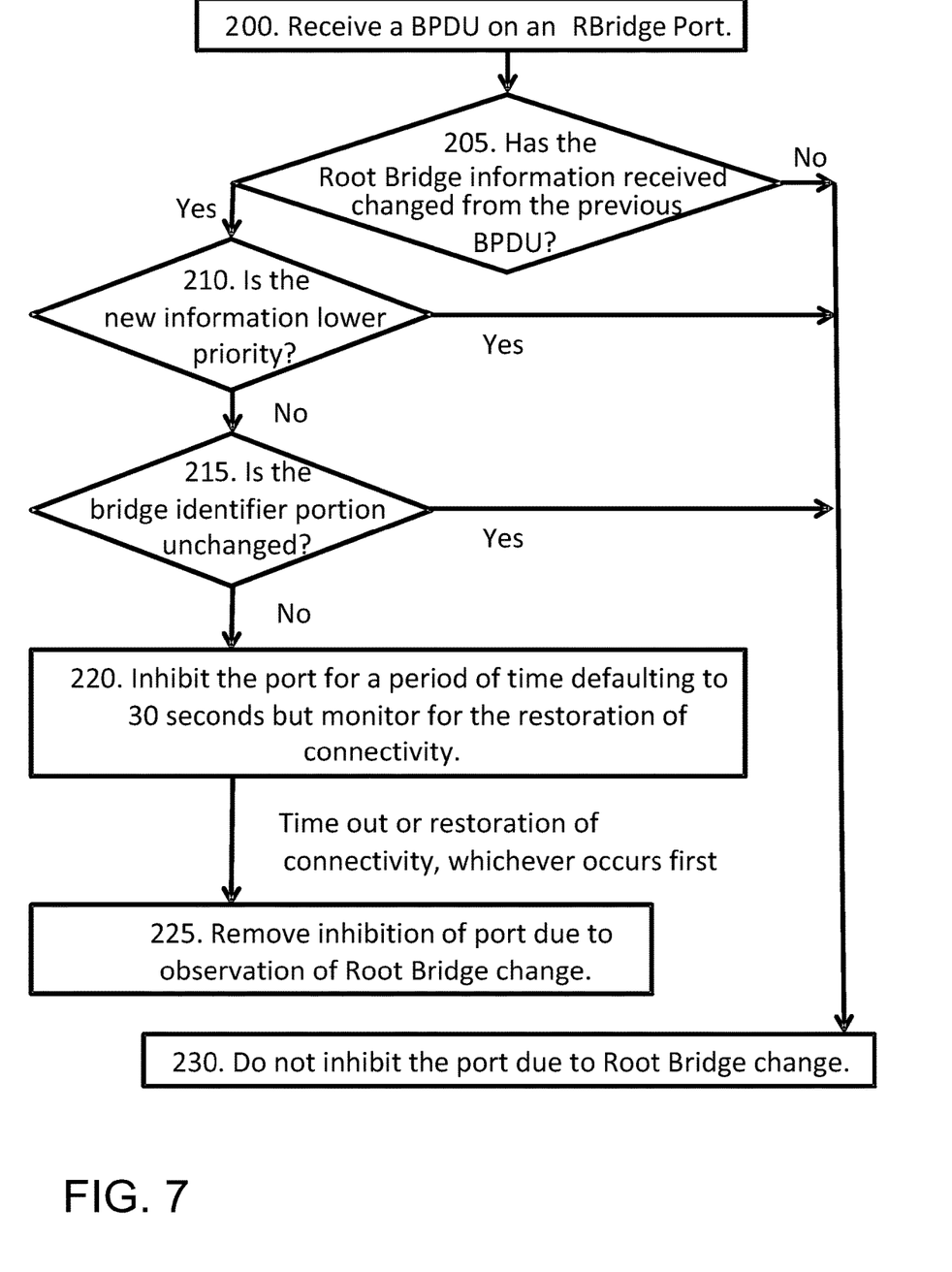
FIG. 7 shows another illustrative process that can be performed by a network device to determine whether to inhibit certain operations, in accordance with some embodiments.

FIG. 7 shows an illustrative process that can be performed by a network device (e.g., an RBridge) to determine whether to inhibit certain operations, in accordance with some embodiments.

In this example, a BPDU message is received on an RBridge port at step 200. At step 205, the Root Bridge Information field in the BPDU is compared to that in a previously received BPDU on that port. If no change is detected, then the process proceeds to step 230 and the port is not inhibited. If at least one change is detected, the process proceeds to step 210 to analyze the change detected at the step 205.

The inventor has recognized an appreciated that, if only a single change has occurred in a bridge LAN link and the overall priority of the root bridge has decreased, it is unlikely that the reduction is due to the connection of an additional bridge or bridges, or to the reconfiguration of a bridge to give that bridge higher priority to be the spanning tree root bridge. For instance, if only a single change has occurred, the probability is very high that no bridges or links have been added or bridges re-configured to increase their priorities. Instead, it is very likely that, a bridge or link has failed, or that a bridge has been re-configured to reduce its priority. In such a case, it is very likely that there has been no increase in connectivity between RBridge ports. Thus, in such situations it may be safe for an RBridge port that is an Appointed Forwarder and detects such a root bridge change to a lower overall priority root ID not to inhibit itself at all.

Accordingly, in the example shown in FIG. 7, the RBridge checks whether the root bridge information has changed to a lower priority value at the step 210. If that is the case, then the process proceeds to step 230 and the port is not inhibited. If that is not the case, the process proceeds to step 215 to further analyze the change detected at the step 205.

In some embodiments, the bridge information used to decide and identify the spanning tree root bridge is a 64-bit quantity of which the top 16 bits include a configurable priority and a lower 48 bits are a globally unique identifier used for tie breaking when priorities are equal. The inventor has further recognized and appreciated that, if the root bridge information seen out an RBridge port changes only in the configurable priority portion, but the remaining 48-bits are the same, then it may be safe to assume that there has been no change in RBridge port connectivity through the bridged LAN. In such a scenario, it is very likely that the only thing that happened was the root bridge being manually reconfigured to a different priority. Thus, inhibition of the port may not be warranted.

Accordingly, in the example shown in FIG. 7, the RBridge checks whether the bridge identifier portion is unchanged at the step 215. If that is the case, then the process proceeds to step 230 and the port is not inhibited. If that is not the case, the process proceeds to step 220 to further analyze the change detected at the step 205.

In some implementations of the TRILL protocol, RBridges in a campus run a link state protocol that reliably floods the campus link state information to those RBridges. For each RBridge, the campus link state information may include the set of root bridge information that each RBridge can see out any of its ports.

The inventor has recognized and appreciated that, assuming an RBridge, RB1, had been seeing root bridge Info1 out a port and then sees a different root bridge Info2, RB1 may know, through the link state information, which other RBridges, if any, had been seeing Info1 and/or Info2 out a port. As soon as connectivity has been restored in the bridged LAN out the port in question, Hello messages may be received on that port from all the relevant RBridges (discussed in greater detail in the following paragraph) connected by the bridged LAN. When such new Hellos have been received, the port inhibition of the RB1 port due to seeing the root bridge change may be removed. If any further inhibition is required for loop safety, such inhibition may be independently caused. When, after seeing new root bridge Info2, the RBridge in question has received and processed a new Hello from all such RBridges, or all that remain if some drop out of the network topology, the RBridge may, with very high probability, assume that connectivity has been restored through the bridge LAN.

In some embodiments, relevant RBridges may be those that are part of the campus of RB1 as revealed in the link state database as seeing either the old or new Root Bridge information. If there are RBridges on the link that are not relevant, the change in root bridge may be due to the merger of two bridged LANs causing the merger of two previously separate campuses. (Note that, in some instances, a campus may have as few as one RBridge with as few as zero end stations attached.) The merged bridged LAN may provide the only connection between the campuses and there may be no danger of a loop in removing the inhibition of the port, whether or not Hellos have been received from the irrelevant RBridges.

Accordingly, in the example shown in FIG. 7, the RBridge waits for a time-out after the step 220, but also monitors whether a Hello message has been received from every relevant RBridge. The inhibition may be removed at step 225 when the time-out has expired, or when a Hello message has been received from every relevant RBridge, whichever occurs first.

Various techniques are described above that may reduce the amount of time during which native frame handling is inhibited on an RBridge port after a detected change in root bridge is observed on that port. These techniques may be used separately, or in any suitable combination. Furthermore, any of these techniques may be implemented in any suitable manner, as aspects of the present disclosure are not limited to any particular manner of implementation.

Figure 8:
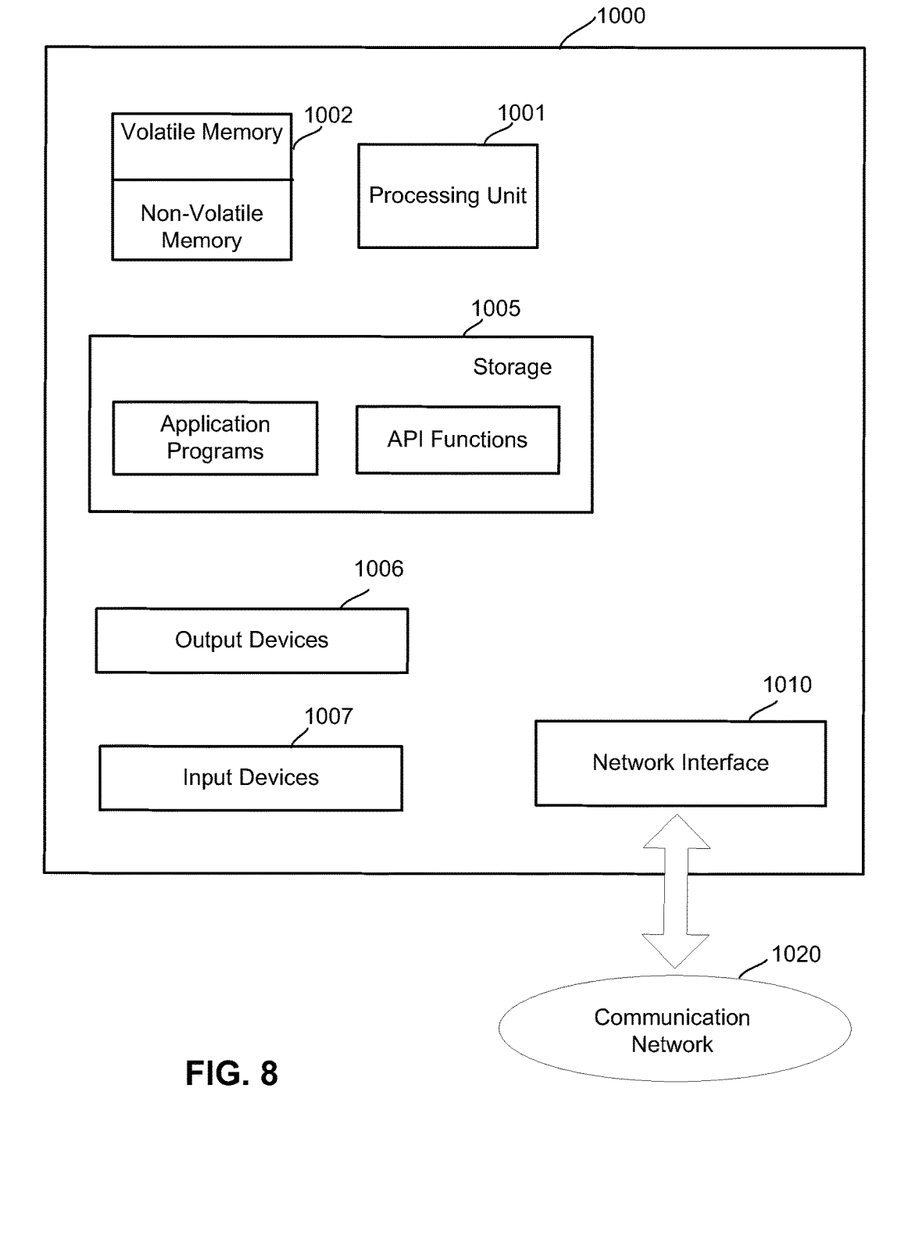
FIG. 8 shows, schematically, an illustrative computer on which various inventive aspects of the present disclosure may be implemented.

FIG. 8 shows, schematically, an illustrative computer 1000 on which various inventive aspects of the present disclosure may be implemented. The computer 1000 includes a processor or processing unit 1001 and a memory 1002 that may include volatile and/or non-volatile memory. The computer 1000 may also include storage 1005 (e.g., one or more disk drives) in addition to the system memory 1002. The memory 1002 may store one or more instructions to program the processing unit 1001 to perform any of the functions described herein. The memory 1002 may also store one more application programs and/or Application Programming Interface (API) functions.

The computer 1000 may have one or more input devices and/or output devices, such as devices 1006 and 1007 illustrated in FIG. 8. These devices may be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible format.

As shown in FIG. 8, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks. Examples include, but are not limited to, bridged LANs and RBridged campuses.

The computer 1000 may be used to implement a switch device that receives and transmits frames of data through network interfaces. Examples of switch devices include, but are not limited to, the following:

Bridges: For example, a bridge device may be generally conformant to any of IEEE (Institute of Electrical and Electronics Engineers) 802.1 bridging standards, including, but not limited to, IEEE 802.1D-2004, "IEEE Standard for Local and Metropolitan Area Networks/Media Access Control (MAC) Bridges," and IEEE 802.1Q-2011, "Standard for Local and Metropolitan Area Networks/Virtual Bridged Local Area Networks," which are incorporated herein by reference. It should be appreciated that a device conformant to a future IEEE 802.1 bridging standard, or a bridging standard developed by some other standard setting organization, may also be considered a "bridge," as aspects of the present disclosure are not limited to conformance to any particular bridging standard, nor to conformance to any standard at all. For example, a bridge device may be a device conformant to a specification for Shortest Path Bridges, which is being developed as an extension of IEEE 802.1, and uses a link state protocol to configure bridging mechanisms.

RBridges: For example, an RBridge device may be generally conformant to IETF (Internet Engineering Task Force) TRILL (TRansparent Interconnection of Lots of Links) standard as set out in IETF RFCs 6325, 6326, and 6327, which are incorporated herein by reference. Again, it should be appreciated that aspects of the present disclosure are not limited to conformance to any particular standard or version of a standard for an RBridge device, nor to conformance to any standard at all.

Routers: For example, a router device may forward or deliver data frames based on Layer 3 addresses specified in the frames. Because local networks use Layer 2 addresses to deliver a frame to a next router or final destination, a router may, on a per-router-hop basis, map Layer 3 addresses to Layer 2 addresses. In some instances, the router may change an outer Layer 2 address of the data frame to transport the frame to the next router or final destination.

Any other network devices adapted to route, forward, and/or deliver frames of data to one or more target interfaces (i.e., network interfaces to which the frames are addressed), or at least attempt to route, forward, and/or deliver the frames closer to the target interfaces.

Any combination of the above. This includes, for example, a BRouter, which is a device adapted to route frames whose Layer 3 addressing protocols are understood by the BRouter, and to bridge all other frames.

Finally, the computer 1000 may be a mobile device that is sufficiently small so as to be carried by a user (e.g., held in a hand of the user). Examples of mobile devices include, but are not limited to, mobile phones, pagers, portable media players, e-book readers, handheld game consoles, personal digital assistants (PDAs) and tablet computers. In some instances, the weight of a mobile device may be at most one pound, and/or the largest dimension of a mobile device may be at most six inches. Additionally, a mobile device may include features that enable the user to use the device at diverse locations. For example, a mobile device may include a power storage device (e.g., battery) so that it may be used for some duration without being plugged into a power outlet. As another example, a mobile device may include a wireless network interface configured to provide a network connection without being physically connected to a network connection point.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method for use by at least one first network device attached to a bridged network, the method comprising acts of:

(a) processing a message received via at least one network interface of the at least one first network device to detect a change relating to a root bridge in the bridged network attached to the at least one first network device, the root bridge being a root bridge according to a spanning tree protocol, the message being directed to a port of the at least one first network device;

(b) determining whether one or more exceptions are applicable to the change relating to the root bridge, comprising:

determining whether a first exception is applicable to the change relating to the root bridge, the first exception being that the operation of the port of the at least one first network device is not to be inhibited if the change relating to the root bridge involves a priority value for the root bridge being lowered; and determining whether a second exception is applicable to the change relating to the root bridge, the second exception being that the operation of the port of the at least one first network device is not to be inhibited if a uniquely identifying portion of an identifier for the root bridge remains unchanged; and (c) if it is determined that no exception is applicable to the change relating to the root bridge, inhibiting operation of the port of the at least one first network device, wherein inhibiting the operation of the port of the at least one first network device comprises:

causing the at least one first network device to ignore at least one native frame received on the port of the at least one first network device, but continue to process TRILL frames; or causing the at least one first network device not to send at least one native frame on the port of the at least one first network device, but continue to send TRILL frames.

2. The method of claim 1, wherein the identifier for the root bridge comprises a configurable priority portion in addition to the uniquely identifying portion, and wherein, under the second exception, the operation of the port of the at least one first network device is not to be inhibited even if the configurable priority portion has changed.

3. The method of claim 1, wherein the at least one first network device comprises an RBridge implementing one or more TRILL protocols.

4. The method of claim 1, further comprising an act of:
(d) while the operation of the port of the at least one first network device is inhibited, monitoring for restoration of connectivity.

5. The method of claim 1, wherein inhibiting the operation of the port of the at least one first network device comprises causing the at least one first network device to ignore at least one native frame received on the port of the at least one first network device, but continue to process TRILL frames.

6. The method of claim 1, wherein inhibiting the operation of the port of the at least one first network device comprises causing the at least one first network device not to send at least one native frame on the port of the at least one first network device, but continue to send TRILL frames.

7. The method of claim 1, wherein the change relating to the root bridge comprises changing from first information to second information, and wherein the method further comprises acts of:

(d) commencing inhibition of the operation of the port of the at least one first network device as a result of the act (c) and setting a selected inhibition time-out period;

(e) using link state information to identify one or more second network devices that are relevant based on the first and second information; and (f) removing the inhibition in response to receiving one or more messages from at least some of the one or more second network devices, wherein the inhibition is removed before the selected inhibition time-out period has elapsed since the act (d).

8. The method of claim 7, wherein the one or more messages comprise, for each of the one or more second network devices, a control message sent by the each of the one or more second network devices to determine local connectivity.

9. An apparatus comprising at least one first network device attached to a bridged network, the at least one first network device comprising:

at least one network interface configured to receive messages from the bridged network attached to the at least one first network device;

at least one memory storing executable instructions; and at least one processor programmed by the executable instructions stored in the at least one memory to:

(a) process a message received via the at least one network interface to detect a change relating to a root bridge in the bridged network attached to the at least one first network device, the root bridge being a root bridge according to a spanning tree protocol, the message being directed to a port of the at least one first network device;

(b) determine whether one or more exceptions are applicable to the change relating to the root bridge, at least in part by:

determining whether a first exception is applicable to the change relating to the root bridge, the first exception being that the operation of the port of the at least one first network device is not to be inhibited if the change relating to the root bridge involves a priority value for the root bridge being lowered; and determining whether a second exception is applicable to the change relating to the root bridge, the second exception being that the operation of the port of the at least one first network device is not to be inhibited if a uniquely identifying portion of an identifier for the root bridge remains unchanged; and (c) if it is determined that no exception is applicable to the change relating to the root bridge, inhibit operation of the port of the at least one first network device at least in part by:

causing the at least one first network device to ignore at least one native frame received on the port of the at least one first network device, but continue to process TRILL frames; or causing the at least one first network device not to send at least one native frame on the port of the at least one first network device, but continue to send TRILL frames.

10. The apparatus of claim 9, wherein the identifier for the root bridge comprises a configurable priority portion in addition to the uniquely identifying portion, and wherein, under the second exception, the operation of the port of the at least one first network device is not to be inhibited even if the configurable priority portion has changed.

11. The apparatus of claim 9, wherein the at least one first network device comprises an RBridge implementing one or more TRILL protocols.

12. The apparatus of claim 9, wherein the executable instructions stored in the at least one memory further program the at least one processor to:
(d) while the operation of the port of the at least one first network device is inhibited, monitor for restoration of connectivity.

13. The apparatus of claim 9, wherein the executable instructions stored in the at least one memory program the at least one processor to inhibit the operation of the port of the at least one first network device at least in part by causing the at least one first network device to ignore at least one native frame received on the port of the at least one first network device, but continue to process TRILL frames.

14. The apparatus of claim 9, wherein the executable instructions stored in the at least one memory program the at least one processor to inhibit the operation of the port of the at least one first network device at least in part by causing the at least one first network device not to send at least one native frame on the port of the at least one first network device, but continue to send TRILL frames.

15. The apparatus of claim 9, wherein the change relating to the root bridge comprises changing from first information to second information, and wherein the executable instructions stored in the at least one memory further program the at least one processor to:
(d) commence inhibition of the operation of the port of the at least one first network device as a result of the act (c) and set a selected inhibition time-out period;
(e) use link state information to identify one or more second network devices that are relevant based on the first and second information; and
(f) remove the inhibition in response to receiving one or more messages from at least some of the one or more second network devices, wherein the inhibition is removed before the selected inhibition time-out period has elapsed since the act (d).

16. The apparatus of claim 15, wherein the one or more messages comprise, for each of the one or more second network devices, a control message sent by the each of the one or more second network devices to determine local connectivity.

17. At least one non-transitory computer-readable medium having encoded thereon instructions which, when executed by at least one processor of at least one first network device, cause the at least one processor to perform a method comprising acts of:
(a) processing a message received via at least one network interface of the at least one first network device to detect a change relating to a root bridge in the bridged network attached to the at least one first network device, the root bridge being a root bridge according to a spanning tree protocol, the message being directed to a port of the at least one first network device;
(b) determining whether one or more exceptions are applicable to the change relating to the root bridge, comprising:
determining whether a first exception is applicable to the change relating to the root bridge, the first exception being that the operation of the port of the at least one first network device is not to be inhibited if the change relating to the root bridge involves a priority value for the root bridge being lowered; and
determining whether a second exception is applicable to the change relating to the root bridge, the second exception being that the operation of the port of the at least one first network device is not to be inhibited if a uniquely identifying portion of an identifier for the root bridge remains unchanged; and
(c) if it is determined that no exception is applicable to the change relating to the root bridge, inhibiting operation of the port of the at least one first network device, wherein inhibiting the operation of the port of the at least one first network device comprises:
causing the at least one first network device to ignore at least one native frame received on the port of the at least one first network device, but continue to process TRILL frames; or
causing the at least one first network device not to send at least one native frame on the port of the at least one first network device, but continue to send TRILL frames.

18. The at least one non-transitory computer-readable medium of claim 17, wherein the method further comprises an act of:
(d) while the operation of the port of the at least one first network device is inhibited, monitoring for restoration of connectivity.

19. The at least one non-transitory computer-readable medium of claim 17, wherein inhibiting the operation of the port of the at least one first network device comprises causing the at least one first network device to ignore at least one native frame received on the port of the at least one first network device, but continue to process TRILL frames.

20. The at least one non-transitory computer-readable medium of claim 17, wherein inhibiting the operation of the port of the at least one first network device comprises causing the at least one first network device not to send at least one native frame on the port of the at least one first network device, but continue to send TRILL frames.

21. The at least one non-transitory computer-readable medium of claim 17, wherein the change relating to the root bridge comprises changing from first information to second information, and wherein the method further comprises acts of:
(d) commencing inhibition of the operation of the port of the at least one first network device as a result of the act (c) and setting a selected inhibition time-out period;
(e) using link state information to identify one or more second network devices that are relevant based on the first and second information; and
(f) removing the inhibition in response to receiving one or more messages from at least some of the one or more second network devices, wherein the inhibition is removed before the selected inhibition time-out period has elapsed since the act (d).

22. The at least one non-transitory computer-readable medium of claim 21, wherein the one or more messages comprise, for each of the one or more second network devices, a control message sent by the each of the one or more second network devices to determine local connectivity.

23. The method of claim 1, wherein inhibiting the operation of the port of the at least one first network device comprises:
causing the at least one first network device to ignore at least one native frame received on the port of the at least one first network device, but continue to process TRILL frames; and
causing the at least one first network device not to send at least one native frame on the port of the at least one first network device, but continue to send TRILL frames.

24. The apparatus of claim 9, wherein the executable instructions stored in the at least one memory program the at least one processor to inhibit the operation of the port of the at least one first network device at least in part by:

causing the at least one first network device to ignore at least one native frame received on the port of the at least one first network device, but continue to process TRILL frames; and     causing the at least one first network device not to send at least one native frame on the port of the at least one first network device, but continue to send TRILL frames.

25. The at least one non-transitory computer-readable medium of claim 17, wherein inhibiting the operation of the port of the at least one first network device comprises:

causing the at least one first network device to ignore at least one native frame received on the port of the at least one first network device, but continue to process TRILL frames; and     causing the at least one first network device not to send at least one native frame on the port of the at least one first network device, but continue to send TRILL frames.

* * * * *